(12) United States Patent
Payne

(10) Patent No.: US 6,802,492 B2
(45) Date of Patent: Oct. 12, 2004

(54) QUICK COUPLER ADAPTER

(76) Inventor: Robert A. Payne, 109 Grove Ct., Stephens City, VA (US) 22655

( * ) Notice: Subject to any disclaimer, the term of this patent is extended or adjusted under 35 U.S.C. 154(b) by 117 days.

(21) Appl. No.: 10/259,415

(22) Filed: Sep. 30, 2002

(65) Prior Publication Data
US 2004/0061089 A1 Apr. 1, 2004

(51) Int. Cl.$^7$ .............................................. F16K 31/50
(52) U.S. Cl. ..................................... 251/265; 251/149.9
(58) Field of Search ........................... 251/149.1–149.9, 251/264–278

(56) References Cited

U.S. PATENT DOCUMENTS

| | | | |
|---|---|---|---|
| 1,846,315 A | * | 2/1932 | Crowley |
| 3,387,621 A | | 6/1968 | Schaff |
| 3,731,718 A | * | 5/1973 | Gramig ........................ 141/384 |
| 4,266,813 A | | 5/1981 | Oliver |
| 4,458,719 A | * | 7/1984 | Strybel .................. 137/614.03 |
| 4,488,704 A | * | 12/1984 | Wicker ........................ 251/265 |
| 4,591,192 A | | 5/1986 | Van Exel et al. |
| 4,921,013 A | | 5/1990 | Spalink et al. |
| 5,076,324 A | * | 12/1991 | Herman et al. |
| 5,139,049 A | * | 8/1992 | Jensen et al. |
| 5,213,144 A | * | 5/1993 | Campbell et al. |
| 5,293,902 A | * | 3/1994 | Lapierie ................. 137/614.04 |
| 5,339,862 A | * | 8/1994 | Haunhorst |
| 5,380,019 A | | 1/1995 | Hillery et al. |
| 5,415,200 A | * | 5/1995 | Haunhorst et al. |
| 5,454,960 A | * | 10/1995 | Newsom ...................... 210/805 |
| 5,518,279 A | | 5/1996 | Harle |
| 5,829,339 A | | 11/1998 | Smith |
| 5,868,224 A | | 2/1999 | DiCarlo |
| 5,975,118 A | | 11/1999 | Ulicny et al. |
| 6,293,596 B1 | | 9/2001 | Kinder |
| 6,315,330 B1 | | 11/2001 | Byerly |

* cited by examiner

Primary Examiner—Paul J. Hirsch
(74) Attorney, Agent, or Firm—Whitham, Curtis & Christofferson, P.C.

(57) ABSTRACT

A adapter provides for connection of a pressure relief mechanism to a connection fitting portion of a quick connect fitting through a mating connection fitting portion and provides for movement of the pressure relief mechanism against a check valve in a hydraulic fluid conduit through a screw thread connection to the adapter. When the check valve is thus opened fluid flow is provided substantially axially through the pressure relief mechanism, thereby reducing the likelihood of disengagement of respective portions of the quick connect fitting when hydraulic fluid is present. Collection of hydraulic fluid in a vessel connected to the pressure relief mechanism is provided to allow recycling of the fluid and to prevent release of the fluid into the environment.

14 Claims, 2 Drawing Sheets

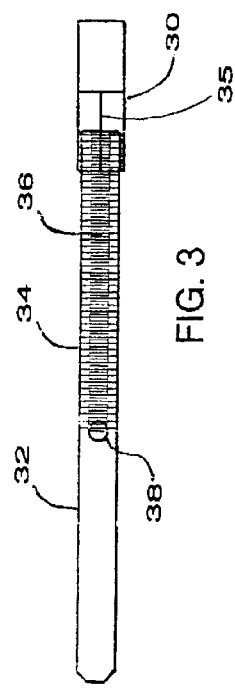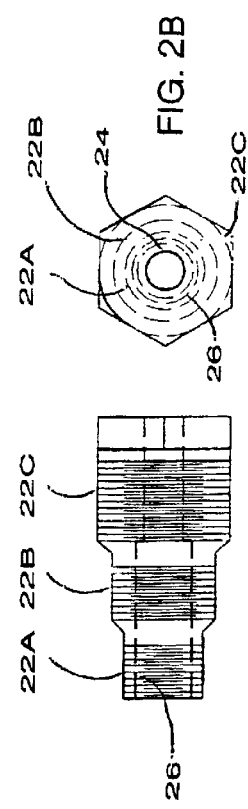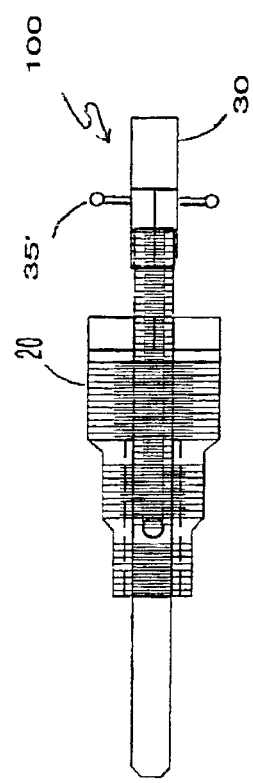

QUICK COUPLER ADAPTER

BACKGROUND OF THE INVENTION

1. Field of the Invention

The present invention generally relates to the operation, maintenance and servicing of machines which include hydraulic systems and, more particularly, to the connection and disconnection of hydraulic fluid conveying lines with improved safety and reduced risk of loss of hydraulic fluid.

2. Description of the Prior Art

The industrial age has been characterized by the construction and utilization of machines which provide forces beyond those which can be produced practically by one or more persons to perform work of a nature or at a rate previously far beyond human capacity. Such machines characteristically include one or more sources of power and some arrangement to transfer such power from each such source to the location in or on the machine where power is required. Hydraulic systems have become a well-known and well understood arrangement for transferring power from the power source to an arbitrary location which is often preferred, despite is relative complexity, since it offers the advantages of providing potentially precise remote control, efficient transfer of large amounts of power and freedom from constraints imposed by the geometry of the machine, which may need to be varied as the machine is used.

Therefore, hydraulic systems have been used in many applications where the machines are mobile and/or where relatively large forces may be required to provide controlled relative motion of parts of the machine. Well-recognized applications include power steering on automobiles and mechanisms for moving materials relative to the machine, such as earth-moving equipment, large snow plows, mobile cranes and the like.

It is also a common requirement, for economy, ease of maintenance or storage and the like, to provide the capacity to reconfigure the machine at will by providing folding or telescoping portions or removal of large portions of the machine such as for maintenance or seasonal storage or to provide for multiple uses of a single power source in a basic machine having a variety of interchangeable attachment mechanisms. To accommodate such arrangements and mechanisms, it is often convenient or, in some cases, necessary, to provide for disconnection of hydraulic fluid-carrying lines with convenient mechanisms such as a so-called quick-connect coupler (sometimes also referred to as a quick-disconnect coupler or simply "coupler" when the context is evident to identify the type of coupler as being of this type). These arrangements are often provided as a pair of mating fittings which can be securely attached to each other or separated by hand, ideally without the use of tools, and requiring very little force to be manually applied.

The mechanical advantage necessary to achieve such a function is generally provided by retractable metal spheres similar to ball bearings which engage a generally tapered groove in a mating part of the coupler and are held in place by a movable ring which can allow or prevent retraction of the spheres. This ring is generally spring loaded to return it to a position where retraction of the spheres is prevented when the ring is not actively moved from that position. Thus, the spheres are forced into the non-retracted or extended position when the ring is released to engage the groove and to maintain the respective parts of the coupler securely affixed together. The tapering of the groove also provides compression between the mating parts of the coupler to avoid leakage and to resist internal pressure.

Unfortunately, improper seating of the spheres in the groove to form a secure connection of the mating parts may not be fully evident from the appearance of the coupler when a connection is made. If the parts of the coupler are not properly seated together and fully engaged, the coupler may become disconnected when pressure is applied, particularly if a non-axial force is also present and sufficiently coincides with the location of improperly constrained spheres. Any fluid flow, static pressure or associated mechanical arrangements such as check valves which are manipulated as coupler parts are joined together may also increase the difficulty of achieving proper seating together of the coupler parts.

Further, such a coupler, itself, does not usually have any arrangement to prevent flow from the fluid-carrying system or ingress of contaminants into it when the coupler is disconnected. Therefore, when such a coupler is used in a system carrying a particular fluid, such as hydraulic fluid, a check valve is usually employed adjacent to the coupler or integrally formed therewith to prevent loss of fluid and/or contamination. Such a provision is particularly necessary in, for example, hydraulic systems in which the fluid, to be sufficiently non-compressible and to posses other necessary properties, cannot be made non-toxic.

Unfortunately, such check valves can also allow the hydraulic system to become pressurized while a hydraulic line or conduit is disconnected. Such pressurization can occur through operation of the machine with the line disconnected or even through environmental circumstances such as an increase in ambient temperature causing expansion of the hydraulic fluid. If a hydraulic line is connected while the system is pressurized against the check valve, the system will not be functional since the check valve will continue to resist fluid flow unless and until the pressure is overcome.

In this regard, it should be noted that most hydraulic systems use recirculating flow of fluid and two hydraulic lines are generally used to support fluid flow in opposite directions into or out of the machine and part, respectively. Check valves are generally used on both sides of each coupler to avoid both fluid loss and contamination. Fluid flow into the machine or part tends to counteract any existing pressure in the line and thus does not present a problem. However, fluid pressure corresponding to the outward direction of flow from the machine or part will maintain the check valve in a closed position, preventing flow during operation of the machine. Accordingly operation of the machine cannot provide for opening of the check valve since operation provides pressure in the same direction as any existing pressure in the hydraulic system.

Therefore, it is conventional to provide a mechanical arrangement to hold check valves open on both sides of the coupler when the coupler parts are connected. However, if the line is pressurized, any such mechanical arrangement will prevent the coupler parts from seating together to make a connection and thus pressure against the check valve must be released whenever a connection of a disconnectable line is made.

At the present state of the art, the only technique available and consistent with the operation of a quick-connect coupler is to unseat the check valve manually; generally by using a punch which is placed against the moveable portion of the valve and struck with an implement such as a hammer. Neither of these tools are generally used in other operations on the machine generally performed during operations requiring the connection of hydraulic lines; thus presenting a substantial inconvenience. Also, while the check valve is generally made of steel in a ball-shaped or pointed configuration, the punch or other tool must be a specially made of a softer material such as brass to avoid or at least minimize damage thereto resulting in a relatively non-durable tool. For this reason, use of a tool of softer material often results in particles of the punch being removed and deposited within the valve or coupler part from which they can become dislodged, circulate through the system and cause damage to pumps, control valves and hydraulic actuators or prevent proper functioning of the check valves. Valves of pointed configuration tend to increase such chipping of the punch. In practice, however, maintenance personnel will tend to use any tool available, such as an ordinary screwdriver, which is much more likely to damage the check valve and produce particles or chips of harder and even more potentially damaging material.

Perhaps more importantly, such an arrangement and technique does not provide for avoidance of loss of (usually toxic) fluid from the system as it is depressurized. There is a safety concern, as well, since hydraulic systems can contain pressures sufficient to drive the hydraulic fluid through the skin of the person performing the depressurization operation, much in the nature of an inoculation. The likelihood of such an occurrence is increased by the common practice of wrapping the connection (and punch) in a rag which is manually held in place while the punch is struck in an effort to avoid or reduce release of the fluid into the environment.

Specialized tools are known for depressurizing some types of fluid handling systems while collecting fluid therefrom but which are not readily applicable to systems such as hydraulic systems which may contain much higher pressures, denser fluid and/or are generally depressurized only for service and are provided with a standardized fitting for such purpose. For example, U.S. Pat. No. 4,921,013 to Spalink et al. is directed to a tool for axially moving a part of a self-sealing valve in a refrigeration system such as an automotive air conditioner, heat pump or the like. When the stool is attached to the valve using a quick coupler and the check valve is opened by the movement of a threaded valve actuator, refrigerant (generally in a vapor phase at relatively low pressure) is released into the body of the tool and, as a further valve within the tool is opened, the refrigerant flows out of a fluid port formed in the side of the tool for collection.

However, such a design would present several problems if applied to other types of fluid handling systems such as hydraulic systems. If used to depressurize a system using fluid in a denser, liquid phase and at higher pressure, the acceleration of fluid during redirection to a lateral port can cause substantial lateral forces that may unseat the quick connect coupler; causing the tool to become detached from the system and loss of fluid into the environment and possible injury to the user. More importantly from the standpoint of economy and convenience, it is common practice to provide a valve for depressurizing of the system in a standardized form and size since depressurization is usually performed only for relatively infrequent servicing the system. Thus a standard tool can be used on virtually all systems of a given type and the relative convenience of location and expense of providing an additional fitting to allow depressurization is of relatively low importance.

However, in the case of attachment of hydraulic lines to machines or the like, many different sizes of lines and couplers as well as couplers made by different manufacturers (which may not be compatible) may be encountered and it is highly inconvenient to depressurize a line at any location other than the coupler at which an attachment of a connecting line is to be made. Therefore, a different specialized, complex and expensive tool would be required for each size/diameter of line and each manufacturer of coupler fittings which may be encountered which would, itself present substantial cost and inconvenience. By the same token, the lateral port essentially characterizes the specialization of such tools and a commercially available coupler for which compatibility is expected cannot be modified to form a part of the specialized tool since the region in which a lateral port would be made is thin and presents a convex surface that can be drilled only with difficulty and weakening of the fitting and cannot generally be tapped to form the lateral port by a threaded joint. Accordingly, there has been no reasonable alternative to depressurization of hydraulic lines and the like using a punch or other available tool notwithstanding the drawbacks and dangers thereof as discussed above.

SUMMARY OF THE INVENTION

It is therefore an object of the present invention to provide an easily employed mechanism for depressurizing a hydraulic system safely and without loss of fluid into the environment and without damage to the hydraulic system.

It is another object of the invention to allow use of commercially available couplers for attachment of a depressurizing arrangement to a pressurized system such as a hydraulic line.

In order to accomplish these and other objects of the invention, an apparatus for releasing pressure from a conduit having a check valve in the proximity of a connection fitting is provided comprising a body adapted to removably engage a mating fitting for said connection fitting and an internal axial bore, and a pressure release mechanism engaging a portion of the inner axial bore with a screw threaded portion of an outer surface and having an axially extending fluid passage therein and a portion for axially engaging the check valve.

In accordance with another aspect of the invention, a method is provided for depressurizing a conduit having a check valve therein including steps of connecting an adapter to a portion of a connection fitting for connection to a portion of another connection fitting, applying forces to the check valve along an axis of the adapter, and releasing fluid from the check valve to flow through the adapter in a direction substantially axial of the adapter.

BRIEF DESCRIPTION OF THE DRAWINGS

The foregoing and other objects, aspects and advantages will be better understood from the following detailed description of a preferred embodiment of the invention with reference to the drawings, in which:

FIG. 1A is a side, partially sectional view of the quick coupler adapter with pressure release mechanism in accordance with the invention, FIGS. 2A and 2B are side and end/axial views, respectively, of the quick coupler adapter body part of FIG. 1A, FIG. 3 is a side view of the pressure release mechanism of FIG. 1A.

DETAILED DESCRIPTION OF A PREFERRED EMBODIMENT OF THE INVENTION

Figure 1B:
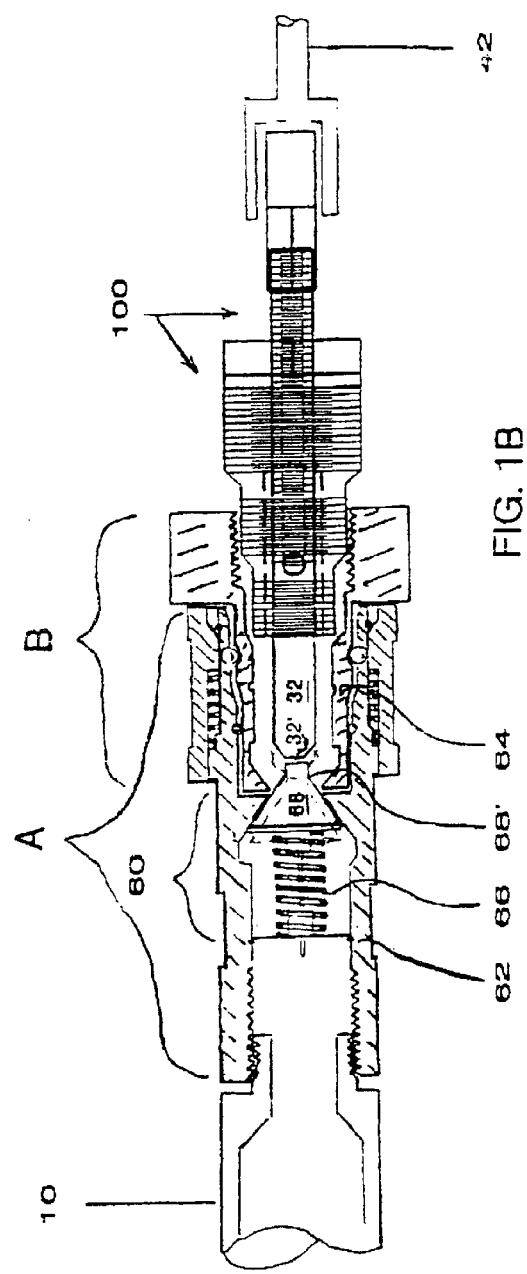
FIG. 1B is a side, partially sectional view of the quick coupler adapter with pressure release mechanism in accordance with the invention with a quick coupler part attached thereto and attached to a mating quick coupler part including a check valve.

Referring now to the drawings, and more particularly to FIG. 1A, there is shown a side and partially sectional view of the assembled quick coupler adapter 100 including body 20 and the pressure relief mechanism 30 in accordance with the invention. FIG. 1B shows the same mechanism 100 assembled with quick-coupler fittings as would be the case in normal use while FIGS. 2A, 2B and 3 are side views of the individual parts 20, 30 of the device of FIG. 1A. It should be noted that the quick coupler part indicated generally at A of FIG. 1B (and depicted as the female portion thereof) is a commercially available fitting and a constituent part of an existing machine or attachment therefor. The portion of the quick connect fitting indicated generally at B of FIG. 1B (and depicted as the male portion of the fitting) is also commercially available but modified by the removal of the integrally formed check valve corresponding to that indicated generally at 60 by removal of a snap ring 62 from groove 64, allowing valve 68 with actuator 68' and spring 66 or other corresponding structure to be removed. In this modified state without a check valve, the fitting is referred to as a "flow-through" coupler part which is also commercially available.

By the same token, it should be recognized that the details of the portions A, B of the quick connect coupler are of no importance to the remainder of the structure of the invention and the invention is usable with other types of fittings including custom fabricated fittings. Conversely, it is preferred that the portions of the quick disconnect fitting be commercially available parts since the parts upon which the invention operates (e.g. fitting A with integral valve 60 connected to hydraulic line 10) are necessarily commercially available parts installed on existing machinery and compatibility of corresponding commercially available parts is substantially guaranteed. However, since the depiction in FIG. 1B is generalized in view of the many different designs of commercially available fittings, no portion of any Figure is admitted to be prior art in regard to the present invention.

As most clearly illustrated in FIGS. 1A, 2A and 2B, the quick coupler adapter body part 20 has an outer threaded surface 22, preferably divided into three sections of different diameter 22A, 22B and 22C to accommodate different sizes of commercially available fittings corresponding to commonly used sizes of hydraulic lines. The thread designs for each diameter are standardized within the industry. The differently sized divisions of surface 22 is preferably limited to three since more sections would not be fully compatible with the geometries of commercially available fittings since the end having the smaller diameter divisions would extend too far into larger sizes of coupler if more than three sections are provided without reducing the respective lengths of the respective divisions. Further, while adapters for any single size or two sizes of coupler/hydraulic line could be provided, the adapter body 20 in accordance with the invention is scalable and two differently sized bodies which are compatible with all commercially available fittings, each including three differently sized threaded divisions will cover all sizes and suppliers/designs of commercially available fittings generally encountered in the vast majority of machines including hydraulic systems in operation at the current time. Therefore the form of adapter body shown is much preferred.

Adapter body 20 also has an internal opening or bore extending in the axial direction preferably formed in two sections. Bore 24 is of smaller diameter and internally threaded to engage pressure release mechanism 30, as will be described in greater detail below. Bore 26 is of larger diameter and preferably sized to provide a cross-sectional area at least equal to the cross sectional area of the interior bore 32 of pressure release mechanism 30 around the exterior surface thereof in order to provide for flow of hydraulic fluid when pressure is released. Bores 24 and 26 are not at all critical in size or configuration as long as sufficient material remains to support the outer threaded portions 22A and possibly 22B which may be required to carry substantial loads as pressure is released and which must be sized to engage commercially available fittings.

The pressure release part or mechanism 30 is preferably of a one-piece form as shown in FIG. 3. This part or mechanism is preferably machined from a rod of steel or stainless steel to have a portion with a smooth outer surface 32 (although axial or circumferential grooves could be provided to regulate speed of flow of fluid thereover) and a screw threaded outer surface portion 34, sized to engage screw threaded inner bore 24 of the adapter body 20. An internal bore 36 is provided in an axial direction from one end of the mechanism 30 through the interior of at least the threaded portion 34 to provide a fluid flow path through the adapter and pressure release mechanism. One or more holes 38 are provided to connect the outer surface to the inner bore, preferably at the juncture of regions 32 and 34. (The outer diameter of portion 32 can be made slightly smaller than the interior diameter of bore 24 to allow fluid to reach hole 38 even though hole 38 may be within the threaded inner bore 24 if necessitated by the geometry of fittings and check valves but this has not been found necessary to accommodate fittings currently commercially available.

The relative lengths of portions 32 and 34 are determined to correspond to the lengths of valve actuators 68' when the invention is assembled with an existing fitting on a machine or attachment being serviced. The cross-sectional area of holes 38 should be generally similar to the cross-sectional area of inner bore 36 but may be somewhat smaller to avoid weakening of the mechanism 30. The end of the mechanism from which the inner bore extends is preferably formed with an outer surface 35 which is adapted to be turned (e.g. by knurling, having a hexagonal prism shape to be gripped by pliers or a wrench, and/or formed with extensions 35 arranged to be gripped manually or to be engaged by a variety of common tools and which may be integrally formed therewith or fixedly or removably attached and the like) in a convenient manner but which adaptation is not important to the principles of operation of the invention.

In operation, as shown in FIG. 1B, a modified or commercially available "flow through" fitting portion B is attached to the adapter body 20 on one of the threaded divisions 22A–22C and connected to a mating coupler portion. The operation of the invention is identical for both male and female coupler portions as long as the portion connected to the adapter body is modified by removal of any check valve that may be present so as to be of the "flow through" type. The assembled adapter and "flow through" coupler portion is then attached to an existing quick coupler portion A. It is not necessary for the pressure release mechanism 30 to be assembled with the adapter body 20 at this point but, if so assembled, should be retracted by unscrewing within threaded bore 24 such that it does not engage valve actuator 68'. If not retracted, retraction will generally be necessary in order to engage the quick disconnect portions A and B because of interference with the valve actuator 68'.

Figure 4:
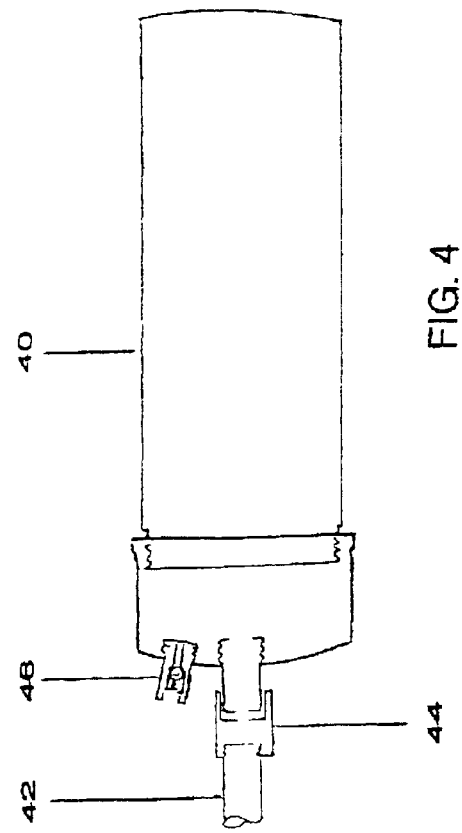
FIG. 4 is a side view of a preferred form of fluid collection vessel in accordance with the invention.

When the quick coupler is assembled and pressure relief mechanism 30 is in place, collection vessel 40, shown in FIG. 4 is attached to the pressure relief mechanism 30 by hose 42 and fitting 44 which also allows the vessel to be opened for removal of fluid for recycling or re-use. It is preferred that collection vessel be sized to be carried and manipulated easily while of sufficient volume that pressure increase within it will not cause damage to it before air pressure is released through a pressure relief valve 46 which should preferably be arranged to preferentially release gaseous fluids at low pressure while avoiding release of hydraulic fluid in any significant quantity. In general, collection vessel 40 can be made smaller if able to bear several atmospheres of pressure. Vessels similar to familiar small propane tanks are suitable for practice of the invention.

Once the collection vessel is in place, the pressure relief mechanism is rotated to drive the mechanism toward fitting portion A. When sufficiently extended, the end 32' of portion 32 axially engages the check valve 68 through valve actuator 68' and continued rotation will then move the check valve body 68 away from its seated position (e.g. to the position depicted in dashed lines) and allow release of pressure from the hydraulic line 10. The pitch of threads on the threaded portions 24, 34 can be made as fine or shallow as desired to increase mechanical advantage of rotation of mechanism 30 over motion of the check valve against existing pressure so that rotating the mechanism 30 will be easy and convenient.

Fluid emerging from the check valve 60 is immediately reduced in pressure by the combined effects of throttling by the check valve itself as the check valve is gradually opened and the release of an initially small volume of fluid (as regulated by the check valve) into the internal volume of the coupling and adapter. As fluid flow increases, the fluid flows past section 32 of the pressure release mechanism 30, through hole 38 and then though bore 36 and hose 42 into collection vessel 40. Thus the hydraulic system can have existing pressure released therefrom without loss of fluid into the environment and without use of punches and the like to unseat the check valve and the undesirable effects which may result.

When the pressure has been released, quick connect fitting portions can be disengaged and the working hydraulic line of the machine or attachment (after having been similarly depressurized, if necessary) can be assembled. It should be noted that, upon removal of the coupler portion B and the connected adapter (or retraction of the pressure relief mechanism 30) check valve 68 will again be seated through the action of spring 66. However, since pressure has been released, the check valve 68 is easily re-opened by valve actuator 68' being engaged by the corresponding valve actuator 68' terminating the hydraulic line being attached. Thus the check valves 68 and their respective actuators provide that both check valves are held open during machine operation through their mutual coupling and internal valve structures.

It is considered important to the performance and safety of the present invention, particularly in view of the pressures which may be encountered and released, that the pressure relief mechanism 30 provide for axial fluid flow over substantially the entirety of the assembly of FIG. 1B in which the only non-axial flow region is at hole(s) 38 which can be formed symmetrically about the common axis of the adapter body 20 and pressure relief mechanism 30. Even if holes 38 are not formed with axial symmetry, the mass of the fluid being redirected therein is minimal to the point of being negligible as fluid pressure is released and hydraulic fluid can be potentially driven to a high velocity. If such high velocity fluid is redirected in a wholly or partially radial direction at high volume, it is possible to develop lateral forces which may cause an incompletely seated quick disconnect fitting to become disengaged and to blow apart under the sudden release of high pressure. If the preferred configuration of the invention is followed, however, rapid release of pressure and fluid volume develop forces axially which are less likely to cause disengagement of the coupler.

By the same token, the basic principles of the invention provide, in operation, several inherent safety features in this regard. Specifically, prior to opening of the check valve, axial forces are developed by the rotation of the pressure relief mechanism 30 reach a maximum before the check valve is unseated. Since the invention provides for slow opening of the check valve consistent with ease of rotation of the pressure relief mechanism 30, axial forces are actually reduced as the opening of the check valve and pressure relief begins. Further, during rotation of the pressure relief mechanism, both radial and rotational forces are applied to the quick connect fitting which, if the coupling portions are less than fully engaged, may either complete the engagement or cause disconnection before any opening of the check valve or release of fluid occurs. Moreover, by engagement of the pressure relief mechanism 30 with the valve actuator 68' some of the radial forces are stabilized and the forces become more fully axial as fluid is released. Therefore, through several different effects, disengagement of the quick coupler becomes less likely, even if incompletely or improperly engaged, as fluid is released from the check valve while likelihood of disengagement due to incomplete or improper engagement prior to release of fluid when no damage, injury or release of fluid into the environment can occur, is increased. Thus the invention greatly increases the margin of safety even against the possibility of user errors.

It is also considered important to the preferred form of the invention that body 20 be in the form of an adapter and the axial flow through the adapter and pressure release mechanism are consistent with formation of the body 20 in the form of an adapter rather than a specialized tool. It will be recognized by those skilled in the art that formation of body 20 as an adapter which is compatible with quick connect fittings rather than a specialized tool allows the hardware required (e.g. two adapters, one pressure release part and suitable quick connect adapters of the "flow-through" type) to be comparable to and even less than a hammer and punch to limit cost and to encourage use which will provide safety and avoid damage to the machine being serviced while providing compatibility with all sizes and designs of fittings.

In view of the foregoing, it is seen that the invention, particularly in its preferred forms and variations thereon, provide a safe convenient and reliable apparatus and method for release of pressure from hydraulic lines to allow connection thereof. The arrangement of the invention has only a single moving part which is small and easily transported and manipulated while reliably avoiding a need for special tools, damage to equipment or tools, release of toxic substances into the environment and/or injury to personnel.

While the invention has been described in terms of a single preferred embodiment, those skilled in the art will recognize that the invention can be practiced with modification within the spirit and scope of the appended claims.

What is claimed is:

1. An apparatus for releasing pressure from a conduit having a check valve in the proximity of a connection fitting, said apparatus comprising a body having an exterior surface adapted to removably engage an interior surface of a mating fitting for further mating with said connection fitting, said body having an internal axial bore, and a pressure release mechanism engaging with a portion of said internal axial bore at a screw threaded outer surface portion of said pressure release mechanism, said pressure release mechanism further having an axially extending fluid passage therein, a non-axial aperture in fluid communication with said axially extending fluid passage and a portion for axially engaging said check valve.

2. The apparatus as recited in claim 1, further including a fluid collection vessel for receiving fluid from said axially extending fluid passage.

3. The apparatus as recited in claim 1, wherein said body includes a plurality of threaded divisions to removably engage connection fittings of different diameters.

4. The apparatus as recited in claim 1, wherein said pressure release mechanism is formed of a single part.

5. The apparatus as recited in claim 1, wherein said pressure release mechanism includes a smooth surface portion.

6. The apparatus as recited in claim 1, wherein said connection fitting is a quick connect fitting.

7. The apparatus as recited in claim 1 wherein an end potion of said pressure release mechanism is adapted to be turned by a wrench.

8. A method for depressurizing a conduit having a check valve therein, said method including steps of connecting an adapter to a portion of a connection fitting for connection to a mating portion of another connection fitting connected to said conduit, applying force to said check valve along an axis of said adapter, and releasing fluid from said check valve to flow through said adapter in a direction substantially axial of said adapter.

9. The method as recited in claim 8 including the further step of collecting said fluid in a container.

10. The method as recited in claim 8 including the further step of removing a check valve from said connection fitting.

11. The method as recited in claim 8, wherein said step of releasing fluid includes rotating a pressure release mechanism in a threaded engagement between said pressure release mechanism and said adapter.

12. The method as recited in claim 8, wherein said conduit is a hydraulic line installed on a machine.

13. An apparatus as recited in claim 1, wherein said non-axial aperture has cross-sectional area generally similar to the cross-sectional area of said axially extending fluid passage.

14. An apparatus as recited in claim 1, wherein said non-axial aperture is located at the juncture of said screw threaded outer surface portion and a smooth outer surface portion of said pressure release mechanism.

* * * * *